(12) United States Patent
Shenoy

(10) Patent No.: US 12,108,190 B2
(45) Date of Patent: Oct. 1, 2024

(54) AUTOMATIC ENGAGEMENT ANALYTICS IN COLLABORATION AND CONFERENCING

(71) Applicant: Avaya Management L.P., Durham, NC (US)

(72) Inventor: Preetam Pete Shenoy, Bangalore (IN)

(73) Assignee: Avaya Management L.P., Durham, NC (US)

( * ) Notice: Subject to any disclaimer, the term of this patent is extended or adjusted under 35 U.S.C. 154(b) by 0 days.

(21) Appl. No.: 17/967,629

(22) Filed: Oct. 17, 2022

(65) Prior Publication Data

US 2024/0129436 A1    Apr. 18, 2024

(51) Int. Cl.
| | |
|---|---|
| H04N 7/15 | (2006.01) |
| G06F 3/01 | (2006.01) |
| H04L 12/18 | (2006.01) |
| H04L 65/4038 | (2022.01) |
| H04N 7/14 | (2006.01) |

(52) U.S. Cl.
CPC ............. *H04N 7/152* (2013.01); *G06F 3/017* (2013.01); *H04L 12/1822* (2013.01); *H04L 12/1831* (2013.01); *H04L 65/4038* (2013.01); *H04N 7/147* (2013.01)

(58) Field of Classification Search
None
See application file for complete search history.

(56) References Cited

U.S. PATENT DOCUMENTS

2020/0153915 A1*   5/2020   Jain ................... H04L 67/535
2021/0185276 A1*   6/2021   Peters ................. G06V 20/41

* cited by examiner

*Primary Examiner* — Duc Nguyen
*Assistant Examiner* — Assad Mohammed
(74) *Attorney, Agent, or Firm* — Sheridan Ross P.C.

(57) ABSTRACT

Participant attendance is readily determined for remote conferences over a network via use of associated participant devices. Going beyond mere attendance, engagement of a participant is determined by observing their actions (e.g., gestures, head movement, eye position) and interactions (e.g., talking, text chat, etc.) within the conference. Such engagement is scored and the value of the score is then used to trigger engagement responses, such as reporting the score to a repository or stakeholder, or initiating a remediation action, such as addressing a network fault.

20 Claims, 4 Drawing Sheets

AUTOMATIC ENGAGEMENT ANALYTICS IN COLLABORATION AND CONFERENCING

FIELD OF THE DISCLOSURE

The invention relates generally to systems and methods for measuring and responding to conference engagement levels.

BACKGROUND

Collaboration solutions, such as audio and video conferencing collaboration solutions, are popular tools to allow individuals to remotely participate in a conference or meeting. In some collaborations, such as those with a small number of participants, the host and other participants can readily observe who is, and who is not, sufficiently engaged in the conference. However, if a presenter of a conference is discussing a document or presentation, their screen may not be presenting the video from other participants' cameras and, therefore, the presenter may not be able to observe the engagement of other participants. Similarly, as the number of participants increases, it becomes increasingly difficult to determine the degree of engagement of the individual participants. Prior art conferencing systems have the ability to log attendance of participants but lack the ability to provide the owner of the conference or other entity (e.g., employer, hosting company, etc.) with insights about the engagement of the conference participants.

SUMMARY

Conferencing systems may capture attendance of participants, such as time a participant joins and leaves a conference. However, there is a need to go beyond mere attendance metrics to enable a conferencing system to intelligently sense and measure the level of engagement of the participants in a communication utilizing a collaboration tool.

These and other needs are addressed by the various embodiments and configurations of the present invention. The present invention can provide a number of advantages depending on the particular configuration. These and other advantages will be apparent from the disclosure of the invention(s) contained herein.

As a general introduction to the embodiments herein, and in one embodiment, a collaboration tool connects participants via a network and their respective participant communication devices. The collaboration tool may enable communication in a one-to-one, one-to-many, or many-to-many topology, as well as change between topologies. The communications may include one or more of audio, video, text, document sharing, screen sharing, co-browsing, whiteboarding, or other communication types. During a conference, engagement inputs are observed for the participants. The engagement inputs may be observed via their microphone, such as the time spent speaking as compared to the overall meeting duration and/or via their camera capturing a video of the participants and their gestures, expressions, etc. Other inputs include textual interactions, such as via a text chat window provided as a portion of the collaboration tool. In another embodiment, other features provided by the collaboration tool that allow for engagement by a participant may be observed for inputs provided by the participant. For example, a whiteboarding application may allow for participants to contribute to an image and their contribution observed as an engagement.

In one embodiment, engagement metrics are automatically generated for participants in a conference and provide the level of engagement of a conference, or portion thereof, to stakeholders. In other embodiments, the engagement metrics are provided to the collaboration tool and/or other systems to trigger the occurrence of a system event.

In one embodiment, a system is disclosed, comprising: a remote collaboration system, comprising: a network interface to a network; and a microprocessor coupled with a computer memory comprising computer readable instructions; and wherein the microprocessor: broadcasts conference content of a conference, via the network, to a number of participant devices utilized by a corresponding number of participants; receives output signals from a first participant device of the number of participant devices, wherein the output signals observe an action performed by a first participant of the number of participants; calculates an engagement score from the output signals; and performs an engagement action in response to the engagement score.

In another embodiment, a method for operating a remote collaboration system is disclosed, comprising: broadcasting conference content of a conference, via a network, to a number of participant devices utilized by a corresponding number of participants; receiving output signals from a first participant device of the number of participant devices, wherein the output signals observe an action performed by a first participant of the number of participants; calculating an engagement score from the output signals; and performing an engagement action in response to the engagement score.

In another embodiment, a remote collaboration system is disclosed, comprising: means to broadcast conference content of a conference to a number of participant devices utilized by a corresponding number of participants; means to receive output signals from a first participant device of the number of participant devices, wherein the output signals observe an action performed by a first participant of the number of participants; means to calculate an engagement score from the output signals; and means to perform an engagement action in response to the engagement score.

In other embodiments, the engagement score may be provided for a single point or range of time. Additionally or alternatively, the performance appraisals, engagement surveys, and/or other reports may be utilized to report the engagement score or engagement score trends.

A system on a chip (SoC) including any one or more of the above embodiments or aspects of the embodiments described herein.

One or more means for performing any one or more of the above embodiments or aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above embodiments or aspects, wherein the data storage comprises a non-transitory storage device, which may further comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with the like reference number. When such a reference is made in the singular form, but without identification of the sub-reference identifier, it is a reference to one of the like numbered elements, but without limitation as to the particular one of the elements being referenced. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
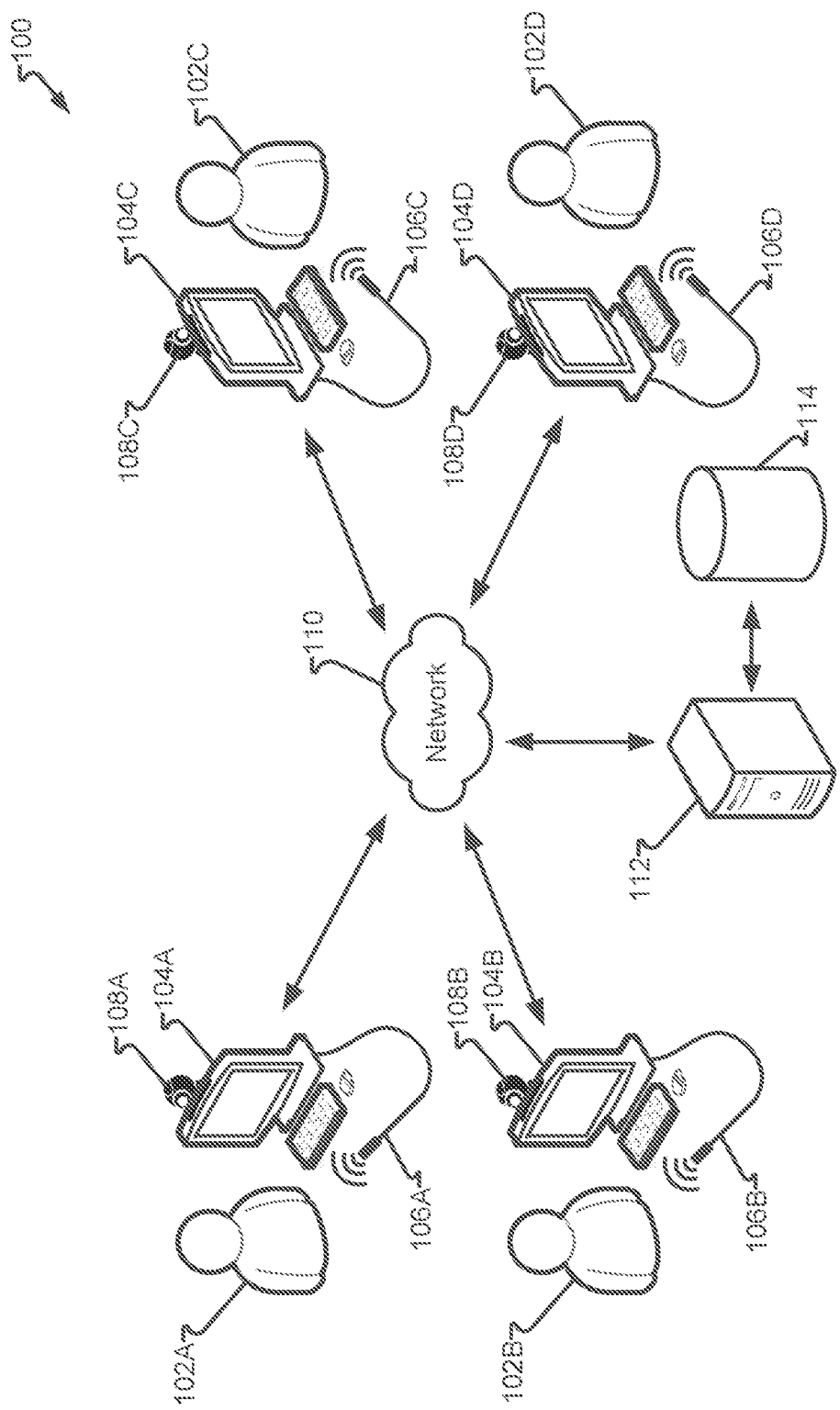
FIG. 1 depicts a system in accordance with embodiments of the present disclosure.

FIG. 1 depicts system 100 in accordance with embodiments of the present disclosure. In one embodiment, participants 102A-D are engaged in a remote conference utilizing their respective participant devices 104A-D to exchange encoded media, and optionally other content, via network 110. In another embodiment, server 112 provides conferencing services which may include, but are not limited to, adding/removing attendees; encoding and broadcasting conference content; receiving conference content from any of one or more of participant devices 104A-D, which may comprise at least a portion of the conference content; recording; transcription; and other services, such as those described in the embodiments that follow.

While four participants 102 are illustrated, wherein each utilizes their respective participant device 104, it should be appreciated that the number of participants and their respective devices may be more or fewer than those illustrated. Certain embodiments disclosed herein may be applicable to as few as two participants and their respective embodiments, and other certain embodiments may not have a limit to the number of participants and their devices.

Each participant device 104 is illustrated as a personal computer having a network interface to network 110 and configured to receive a conference broadcast by server 112. However, it should be appreciated that other device types may be utilized without departing from the scope of the embodiments disclosed herein. For example, a participant may utilize an audio-only telephone and receive only an audio portion of the conference broadcast by server 112. Additionally, such an audio-only device may provide audio-only inputs to server 112. In other embodiments, one or more participant devices 104 may be embodied as smart phones, digital telephones, computers having telephony features (e.g., "soft phone") or other devices having at least a network interface to receive conference content received from server 112 via network 110 for presentation of the conference content, or a portion thereof, and optionally receiving the output of a sensing device (e.g., camera 108, microphone 106, keyboard of participant device 104, etc.) which may be provided to server 112 and incorporated into the conference content.

Participant device 104 comprises at least one input component or peripheral device (e.g., keyboard, touchpad, touchscreen, mouse, keyboard, trackballs, etc.) and/or assistance features to aid those participants 102 having a speech, vision, or hearing impairment. Assistance features may include, but are not limited to, Braille keyboard and/or tactile output, speech-based command entry, text-to-speech, speech-to-text, etc. Participant device 104 comprises at least one output component (e.g., video display, speaker, etc.). Conference content provided to a particular participant device 104 may be customized by server 112 to suit that particular participant device 104. For example, the particular participant device 104 may encode the conference content broadcast to the particular participant device 104 to utilize the bandwidth available and/or include types of communication which the particular participant device 104 is able to utilize (e.g., omit video when the particular participant device 104 is an audio only device, omit audio or converting audio to text when the particular audio device associated with participant device 104 is not configured with speakers, etc.).

As introduced above, server 112 may provide conferencing services for a remote conference or, more simply and as used herein, "conference." However, the use of "conference" shall not be interpreted to include embodiments that exclusively utilize in-person communications. Conferencing services may include floor control, managing bandwidth requirements for each participant device 104, receiving the outputs from one or more participant devices 104 to be incorporated into the conference content and broadcast to the other participants 102, recording, transcription, screen sharing, document sharing, and/or other features. Server 112 may utilize data storage 114 as a repository for conference content (e.g., recordings, shared documents, logs, etc.), configurations (e.g., which participant devices 104 are able to receive particular types of communication, bandwidth limitations of participant device 104, etc.). It should also be appreciated that the topology of system 100 is one topology and, in another topology, the features and functions of server 112 and data storage 114 may be co-embodied with one or more participant devices 104. In other topologies, the various components (e.g., each participant device 104, server 112, data storage 114) may be configured in a different network configuration, such as when data storage 114 is embodied as a discrete storage device(s) having its own network interface to network 110.

In another embodiment, server 112 determines the engagement of participants 102. While some conferences may be more casual and partially or entirely indifferent as to the degree of engagement of the participants, such as a conference for socializing (e.g., club, family, school reunion, etc.), other conferences have a greater investment and similarly greater expectation of the result from the conference. For example, a conference to resolve a critical customer issue, legal proceedings, medical diagnosis, training of emergency responders, etc., may have allocated resources away from other critical activities for a particular conference with the expectation that the participants will fully take advantage of the conference. Attendance by the participants 102 is readily determined. However, engagement of those participants 102 who are attending can be critical to the purpose of the conference. For example, a conference may initially include a discussion of a first topic, for which participant 102A has no interest or expertise, and their lack of engagement during the discussion has little impact. However, if participant 102A is not sufficiently engaged when the conference turns to a second topic, for which they have interest and/or expertise, the conference is impaired and the conference resources, human and communication/computation, are wasted. If a conference is required to be extended or repeated, server 112, participant devices 104, communication components of network 110 (e.g., ports, switches, hubs, trunks, etc. (not shown)) must be allocated and made unavailable for other purposes.

For illustrative purposes, certain embodiments that follow detect, determine, and/or respond to the engagement level of only participant 102A. It should be appreciated that, in other embodiments, more or each of participants 102A-102D may be similarly monitored for engagement and responses provided accordingly.

System 100 illustrates a topology of network components wherein server 112 is broadcasting encoded conference content to participant 102A-102D. The conference content may include, but is not limited to, speech, text, and video from one or more of participants 102A-102D, documents, recorded/live media from other sources, etc. It should be appreciated that conference content originating from a particular participant device 104 may be excluded from receiving such conference content broadcast to the source, such as to avoid audio feedback or the distraction of a particular participant 102 providing video content seeing themselves, usually with a delay.

During the conference, participant 102A may be actively engaged in the conference, such as by speaking, gesturing, typing, etc.; passively participating (e.g., silent, not typing, motionless, etc.); or variations therebetween. Participant device 104A itself or via components or peripheral devices (e.g., microphone 106A, camera 108A, keyboard, mouse, etc.) monitor participant 102A and produce output signals (e.g., encoded video captured by camera 108A, encoded audio captured by microphone 106A, keystrokes entered on a keyboard, mouse movements, etc.). The output signals themselves and/or indicia thereof may be processed, such as by at least one microprocessor of server 112 to determine a level of engagement.

For example, the output signals may show participant 102A attentively looking at their monitor, nodding in agreement with speech provided by another participant 102, taking notes, vocalizing agreement/disagreement/doubt/confusion, such as by inserting speech (e.g., "right," "no," "really!?", etc.) or non-speech utterances (e.g., "huh," "hmm," "oh," etc.), typing comments in a chat box (e.g., "I'll have those test results shortly."), etc. Conversely, the output signals may indicate a lack of engagement with the conference. For example, participant 102A may be distracted and spend time looking away from their display for an extended period of time, speaking to someone nearby, texting on their phone, or merely not being sufficiently engaged in the conference. For example, participant 102A may merely not be engaged for all or a portion of the conference.

The engagement level of participant 102A may be determined by server 112, such as by calculating the result of Formula 1:

$$\text{Engagement Score} = (Tt/Cd * Tw) + (Gt1/Cd * Gw1) + (Gt2/Cd * Gw2) \quad \text{(Formula 1)}$$

Formula 1, wherein:
Tt=talking participation duration;
Cd=conference duration;
Tw=weight given to talking participation;
Gt1=gesture duration; and
Gw1=weight given to the Gt1.

In Example 1, participant 102A attends a conference lasting 60 minutes (Cd), speaks for 5 minutes (Tt), and nods for 10 minutes (Gt1) and time values are in seconds. A weight for the talk (e.g., relevance, impact, etc.) of 100 (Tw) is applied as the discussion provided during (Tt) was on-point or otherwise meaningful to the conference. Gestures may convey a specific meaning (e.g., nodding in agreement or disagreement when asked a specific question) or merely engagement (e.g., nodding in agreement in response to a particular point made by another participant 102). Accordingly, a weight given to the nodding (Gt1) is determined to be 60 (Gw1), resulting in an engagement score of 18.3:

$$\text{Engagement Score} = (300/3600 * 100) + (600/3600 * 60) = 18.3. \quad \text{(Example 1)}$$

In another embodiment, Formula 1 is modified to utilize or include other input signals (e.g., typing text messages into a chat window utilized during the conference, using a mouse to highlight a portion of a whiteboard, etc.) in a similar manner.

Figure 2B:
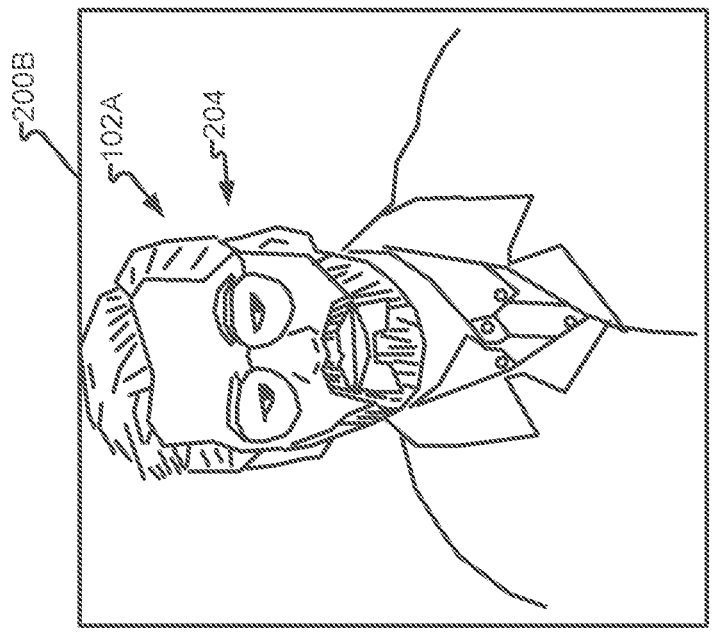
FIGS. 2A-2B depict output signals received during a conference in accordance with embodiments of the present disclosure.
Figure 2A:
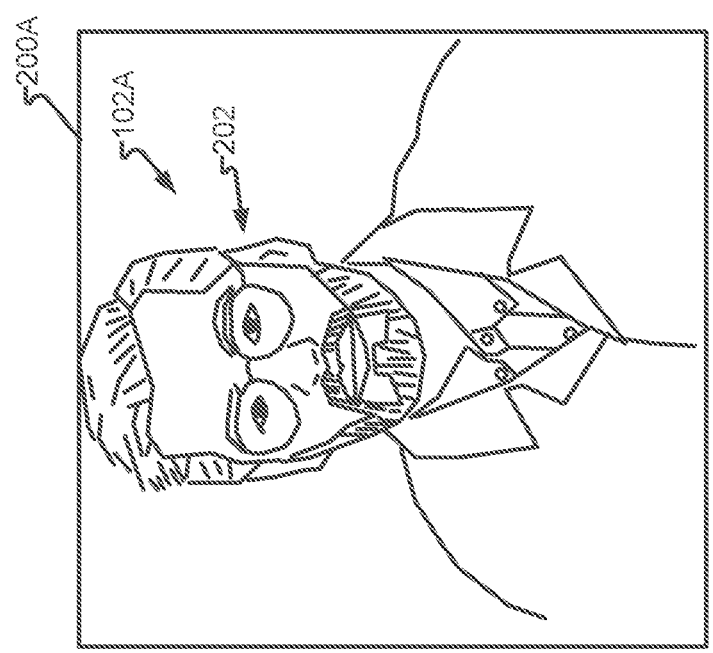

FIGS. 2A-2B depict output signals received during a conference in accordance with embodiments of the present disclosure. Image 200A is a graphical representation of an output signal of camera 108A at a first time and image 200B is a graphical representation of an output signal of camera 108A at a second time. Camera 108A is, or is a portion of, participant device 104A observing participant 102A.

Over the course of a conference, participant 102A is observed to be looking forward 202 (a known location of a display portion or display peripheral device of participant device 104A). Camera 108A observes various gestures (e.g., eye movement, head movement, hand movement, etc.), such as looking forward 202. Looking forward 202 is known to be an indicator of engagement, which may optionally be weighted. For example, paying attention to the video portion of the conference may be less of an engagement indicator, and weighted lower, than actively speaking, which would be weighted higher.

Time spent with eyes looking elsewhere 204 would then be time wherein participant 102A is not (or is to a lesser extent) engaged with the conference. Over the course of the conference, participant 102A may alternate between looking forward 202 and looking elsewhere 204, which is then scored, such as via Formula 1. Other gestures (e.g., nodding, hand gestures, facial expressions, etc.), talking, etc., may be observed in a similar manner.

Figure 3:
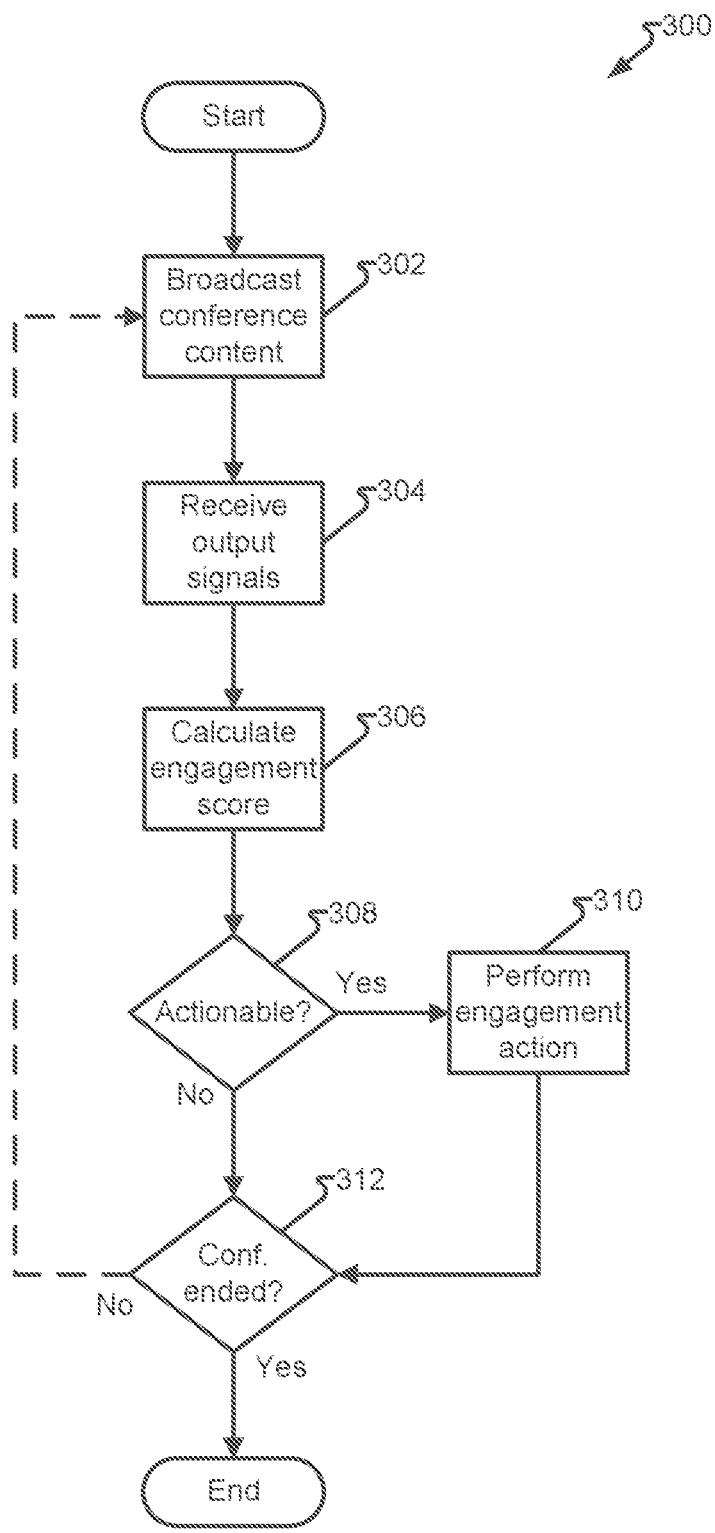
FIG. 3 depicts a process in accordance with embodiments of the present disclosure.

FIG. 3 depicts process 300 in accordance with embodiments of the present disclosure. In one embodiment, process 300 is embodied as machine-readable instructions maintained in a non-transitory memory that when read by a machine, such as a processor of a server, cause the machine to execute the instructions and thereby execute process 300. The processor of the server may include, but is not limited to, at least one processor of server 112. Additionally, process 300 is illustrated as a flowchart having discrete steps as one embodiment. In other embodiments, process 300 is continually executed and, additionally or alternatively, one or more of the individual steps of process 300 may themselves be executed as a continuous process until the conference ends.

Process 300 begins and in step 302 broadcasts conference content to a number of devices, such as participant devices 104A-104D. The conference content may be interactive, wherein some or all of the conference content is provided by one or more of participants 102A-102D via their respective participant devices 104A-104D, playback of previously recorded conference content, or a combination thereof. Step 304 receives output signals from one or more sensing components (e.g., microphone 106, camera 108, keyboard, etc.) monitoring their respective participant 102A-102D during the conference.

From the output signals, step 306 calculates an engagement score. As referenced above, process 300 and/or portions of process 300 may be executed as a continuous process; similarly, step 306 may determine an engagement score for the entirety of a conference, intermittently, or continuously over the course of a conference. When step 306 calculates multiple engagement scores for a single participant 102 over the course of a single conference, additional engagement scores may be produced as an aggregation (e.g., mean, mode, average, above threshold, below threshold, high limit, low limit, change, rate of change, etc.) of the individual engagement scores.

Next, test 308 determines if an engagement score is actionable, such as by exceeding a particular threshold, which may be a high value, low value, or combination (i.e., range of values). Additionally or alternatively, a threshold may have a value and associated time value. For example, a threshold may be a low-value score of "5" for more than 3 minutes. A transient score of "4" for less than 3 minutes would then not be considered to have exceeded the threshold.

If test 308 is determined in the negative, processing continues to test 312. If test 308 is determined in the affirmative, processing continues to step 310. Step 310 is variously embodied and may include reporting the score for storage (e.g., writing a record to a database maintained by data storage 114) or reporting the score to a manager, conference host, etc. In another embodiment, step 310 responds to the score, such as by causing the volume, pitch, or other audio attribute of the audio portion of the conference to be changed as presented by a speaker of participant device 104A. For example, if a low threshold is exceeded, thereby causing test 308 to determine the engagement score is actionable, step 310 may signal participant device 104, or a component or peripheral device thereof, to increase the audio volume. Step 310 (with test 308) may be recursive and an action may be performed and the resulting engagement score determined and, if still exceeding the same or other threshold, a different action may be taken. For example, if the audio volume is increased on participant device 104A but participant 102A remains unengaged, the audio may be further modified (e.g., pitch-shift the tone higher) and/or another action taken (e.g., flash the screen, insert a message, alert a conference host, etc.). Alerting a conference host may be explicit (e.g., a notification that participant 102A is not engaged) or representational. For example, an academic or similar type of a conference may present icons or avatars of participants 102A-102D (e.g., students) in particular locations on the display of a moderator or host (e.g., teacher). Icons in a more prominent location may be called upon sooner or more often than those in a less prominent location. An icon associated with an attentive (or inattentive) participant may be moved to a more (or less) prominent location based on their engagement score. As a result, students who are less engaged may be called upon by the teacher to contribute to the conference (e.g., lesson).

In another embodiment, step 310 may first obtain an engagement score (step 306), determine it is actionable (test 308), and subsequently (step 310) gather additional information. The additional information may be engagement scores of other participants, network metrics (e.g., connection drop or bandwidth issue), topic of discussion of the conference, etc. As a further embodiment, step 310 may then determine if the subsequent information is actionable and, if so, format and send a message. For example, a message may be sent to networking personnel and/or the host of the conference to inform them that networking issues need to be addressed and that one or more participants are unable to engage with the conference at a sufficient level.

Next, test 312 determines if the conference has ended and, if determined in the negative (unless already executing), loops back to step 302. If test 312 is determined in the affirmative, process 300 ends.

Figure 4:
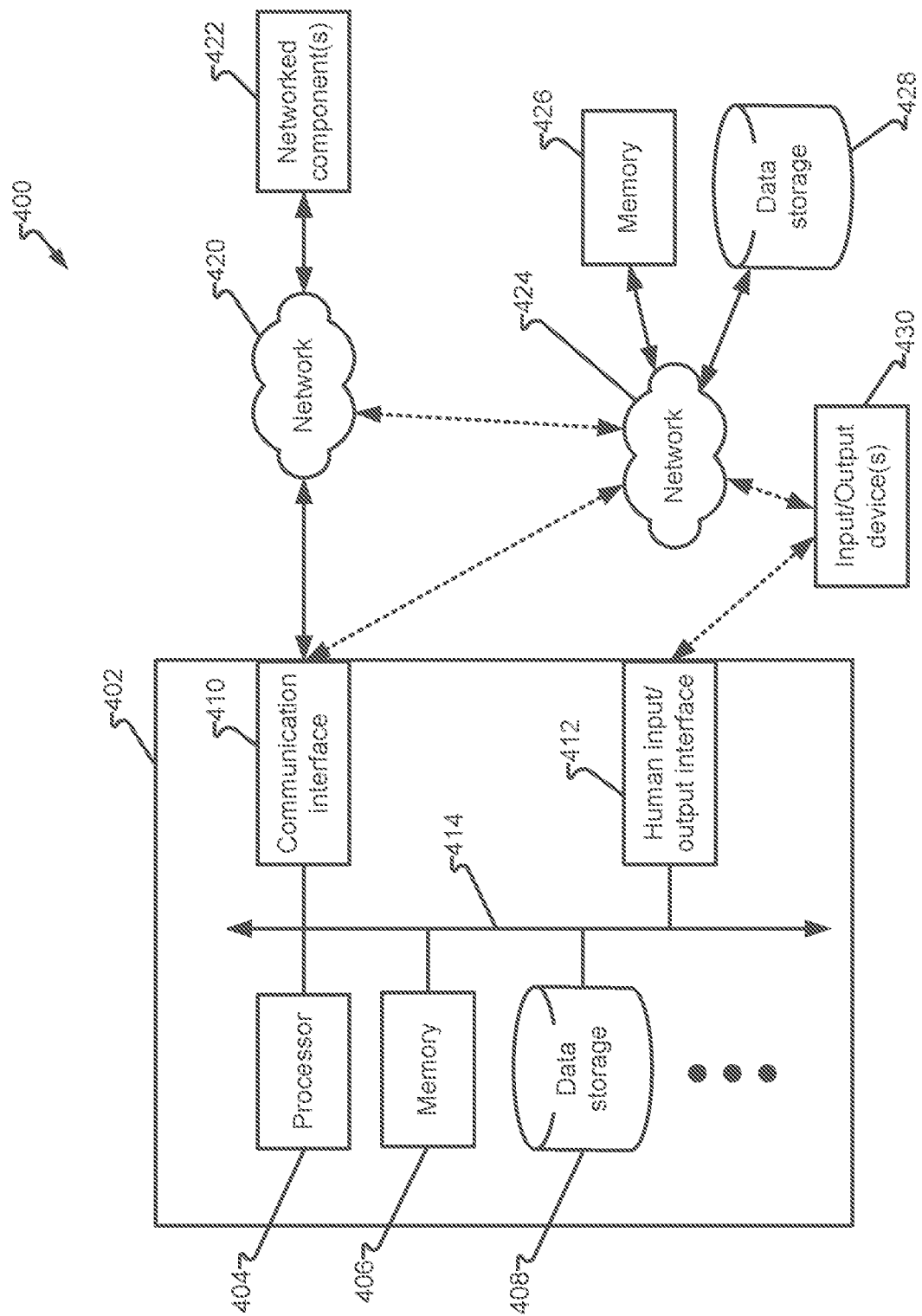
FIG. 4 depicts a device in a system in accordance with embodiments of the present disclosure.

FIG. 4 depicts device 402 in system 400 in accordance with embodiments of the present disclosure. In one embodiment, server 112 may be embodied, in whole or in part, as device 402 comprising various components and connections to other components and/or systems. The components are variously embodied and may comprise processor 404. The term "processor," as used herein, refers exclusively to electronic hardware components comprising electrical circuitry with connections (e.g., pin-outs) to convey encoded electrical signals to and from the electrical circuitry. Processor 404 may comprise programmable logic functionality, such as determined, at least in part, from accessing machine-readable instructions maintained in a non-transitory data storage, which may be embodied as circuitry, on-chip read-only memory, computer memory 406, data storage 408, etc., that cause the processor 404 to perform the steps of the instructions. Processor 404 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 414, executes instructions, and outputs data, again such as via bus 414. In other embodiments, processor 404 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 404 is a non-transitory computing device (e.g., electronic machine comprising circuitry and connections to communicate with other components and devices). Processor 404 may operate a virtual processor, such as to process machine instructions not native to the processor (e.g., translate the VAX operating system and VAX machine instruction code set into Intel® 9xx chipset code to enable VAX-specific applications to execute on a virtual VAX processor). However, as those of ordinary skill understand, such virtual processors are applications executed by hardware, more specifically, the underlying electrical circuitry and other hardware of the processor (e.g., processor 404). Processor 404 may be executed by virtual processors, such as when applications (i.e., Pod) are orchestrated by Kubernetes. Virtual processors enable an application to be presented with what appears to be a static and/or dedicated processor executing the instructions of the application, while underlying non-virtual processor(s) are executing the instructions and may be dynamic and/or split among a number of processors.

In addition to the components of processor 404, device 402 may utilize computer memory 406 and/or data storage 408 for the storage of accessible data, such as instructions, values, etc. Communication interface 410 facilitates communication with components, such as processor 404 via bus 414 with components not accessible via bus 414. Communication interface 410 may be embodied as a network port, card, cable, or other configured hardware device. Additionally or alternatively, human input/output interface 412 connects to one or more interface components to receive and/or present information (e.g., instructions, data, values, etc.) to and/or from a human and/or electronic device. Examples of input/output devices 430 that may be connected to input/output interface include, but are not limited to, keyboard, mouse, trackball, printers, displays, sensor, switch, relay, speaker, microphone, still and/or video camera, etc. In another embodiment, communication interface 410 may comprise, or be comprised by, human input/output interface 412. Communication interface 410 may be configured to communicate directly with a networked component or configured to utilize one or more networks, such as network 420 and/or network 424.

Network 110 may be embodied, in whole or in part, as network 420. Network 420 may be a wired network (e.g., Ethernet), wireless (e.g., WiFi, Bluetooth, cellular, etc.) network, or combination thereof and enable device 402 to communicate with networked component(s) 422. In other embodiments, network 420 may be embodied, in whole or in part, as a telephony network (e.g., public switched telephone network (PSTN), private branch exchange (PBX), cellular telephony network, etc.).

Additionally or alternatively, one or more other networks may be utilized. For example, network 424 may represent a second network, which may facilitate communication with components utilized by device 402. For example, network 424 may be an internal network to a business entity or other organization, whereby components are trusted (or at least more so) than networked components 422, which may be connected to network 420 comprising a public network (e.g., Internet) that may not be as trusted.

Components attached to network 424 may include computer memory 426, data storage 428, input/output device(s) 430, and/or other components that may be accessible to processor 404. For example, computer memory 426 and/or data storage 428 may supplement or supplant computer memory 406 and/or data storage 408 entirely or for a particular task or purpose. As another example, computer memory 426 and/or data storage 428 may be an external data repository (e.g., server farm, array, "cloud," etc.) and enable device 402, and/or other devices, to access data thereon. Similarly, input/output device(s) 430 may be accessed by processor 404 via human input/output interface 412 and/or via communication interface 410 either directly, via network 424, via network 420 alone (not shown), or via networks 424 and 420. Each of computer memory 406, data storage 408, computer memory 426, data storage 428 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 430 may be a router, a switch, a port, or other communication component such that a particular output of processor 404 enables (or disables) input/output device 430, which may be associated with network 420 and/or network 424, to allow (or disallow) communications between two or more nodes on network 420 and/or network 424. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components by, in one or more embodiments, voltages in memory circuits, configuration of switching circuits, and/or by selective use of particular logic gate circuits. Additionally or alternatively, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessors may be integrated into a single processing appliance (e.g., computer, server, blade, etc.) or located entirely, or in part, in a discrete component and connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, a first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A remote collaboration system, comprising:
a network interface to a network; and
a microprocessor coupled with a computer memory comprising computer readable instructions; and
wherein the microprocessor:
  broadcasts conference content of a conference, via the network, to a number of participant devices utilized by a corresponding number of participants;
  receives output signals from a first participant device of the number of participant devices, wherein the output signals observe an action performed by a first participant of the corresponding number of participants;
  calculates an engagement score from the output signals; and
  performs an engagement action in response to the engagement score; and
wherein the engagement score is determined by a formula comprising:

$$\text{Engagement Score} = (Tt/Cd*Tw) + (Gt1/Cd*Gw1) + (Gt2/Cd*Gw2); \text{ and}$$

wherein:
  $Tt$ = talking participation duration;
  $Cd$ = conference duration;
  $Tw$ = weight given to talking participation;
  $Gt1$ = gesture duration; and
  $Gw1$ = weight given to the Gt1.

2. The system of claim 1, wherein the weight given to talking participation (Tw) is determined in accordance with a degree of relevance of speech provided during the talking participation duration (Tt) to a topic of the conference.

3. The system of claim 1, wherein the weight given to talking participation (Tw) is determined in accordance with a degree of change in an engagement score of at least one other participant of the corresponding number of participants following speech provided during the talking participation duration (Tt).

4. The system of claim 1, wherein the weight given to gesture determination (Gw1) participation is determined in accordance with a degree of change in engagement score of at least one other participant following a gesture provided during gesture determination (Gt1).

5. The system of claim 1, wherein the engagement action comprises reporting at least one of the engagement score, average engagement score for the conference, change in engagement score over a course of the conference, change in engagement score over the course of a plurality of conferences, or the engagement score in relation to a threshold.

6. The system of claim 1, wherein the engagement action comprises a first step comprising a determination of whether the engagement score has exceeded a threshold and, in response to the determination that the engagement score exceeded the threshold, performing a second step comprising gathering an additional conference metric.

7. The system of claim 6, wherein the additional conference metric comprises at least one of average engagement score for the conference, change in engagement score over a course of the conference, change in engagement score over the course of a plurality of conferences, or the engagement score in relation to a threshold and wherein the engagement score is determined for one or more of the corresponding number of participants.

8. The system of claim 1, wherein the output signals comprise an output of a sensing device associated with the first participant device engaged in observing the first participant.

9. The system of claim 8, wherein the output of the sensing device is broadcast as a portion of the conference content.

10. The system of claim 8, wherein the sensing device comprises a microphone observing speech produced by the first participant.

11. The system of claim 8, wherein the sensing device comprises a camera observing at least one of duration, type, or degree of at least one of facial expressions, head movement, body position, or gestures produced by the first participant.

12. The system of claim 1, wherein the engagement action comprises signaling the first participant device to alter a presentation attribute of the conference.

13. The system of claim 12, wherein the presentation attribute comprises one of audio volume, audio tone, image brightness, image contrast, or image saturation.

14. A method for operating a remote collaboration system, comprising:
broadcasting conference content of a conference, via a network, to a number of participant devices utilized by a corresponding number of participants;
receiving output signals from a first participant device of the number of participant devices, wherein the output signals observe an action performed by a first participant of the corresponding number of participants;
calculating an engagement score from the output signals; and
performing an engagement action in response to the engagement score; and
wherein the engagement score is determined by a formula comprising:

Engagement Score=$(Tt/Cd*Tw)+(Gt1/Cd*Gw1)+(Gt2/Cd*Gw2)$; and wherein:
Tt=talking participation duration;
Cd=conference duration;
Tw=weight given to talking participation;
Gt1=gesture duration; and
Gw1=weight given to the Gt1.

15. The method of claim 14, wherein the weight given to talking participation (Tw) is determined in accordance with a degree of relevance of speech provided during the talking participation duration (Tt) to a topic of the conference.

16. The method of claim 14, wherein the weight given to talking participation (Tw) is determined in accordance with a degree of change in engagement score of at least one other participant of the corresponding number of participants following speech provided during the talking participation duration (Tt).

17. The method of claim 14, wherein performing the engagement action comprises reporting at least one of the engagement score, average engagement score for the conference, change in engagement score over a course of the conference, change in engagement score over the course of a plurality of conferences, or the engagement score in relation to a threshold.

18. A non-transitory computer readable medium comprising instructions that, when read by a machine, cause the machine to perform:
broadcasting conference content of a conference to a number of participant devices utilized by a corresponding number of participants;
receiving output signals from a first participant device of the number of participant devices, wherein the output signals observe an action performed by a first participant of the corresponding number of participants;
calculating an engagement score from the output signals; and
performing an engagement action in response to the engagement score; and
wherein the engagement score is determined by a formula comprising:

Engagement Score=$(Tt/Cd*Tw)+(Gt1/Cd*Gw1)+(Gt2/Cd*Gw2)$; and wherein:
Tt=talking participation duration;
Cd=conference duration;
Tw=weight given to talking participation;
Gt1=gesture duration; and
Gw1=weight given to the Gt1.

19. The non-transitory computer readable medium of claim 18, wherein the engagement action comprises reporting at least one of the engagement score, average engagement score for the conference, change in engagement score over a course of the conference, change in engagement score over the course of a plurality of conferences, or the engagement score in relation to a threshold.

20. The non-transitory computer readable medium of claim 18, wherein the engagement action comprises a first step comprising a determination of whether the engagement score has exceeded a threshold and, in response to the determination that the engagement score exceeded the threshold, performing a second step comprising gathering an additional conference metric.

* * * * *